(12) United States Patent  
Barrese et al.

(10) Patent No.: US 7,499,539 B2  
(45) Date of Patent: Mar. 3, 2009

(54) TELEPHONE LINE POWER SUPPLY

(75) Inventors: Michael A. Barrese, Middletown, NJ (US); Brad L. Grande, Marlboro, NJ (US); Vernon Glen Koll, Hazlet, NJ (US); Eugene Joseph Yurek, Hazlet, NJ (US)

(73) Assignee: Agere Systems, Inc., Allentown, PA (US)

( * ) Notice: Subject to any disclaimer, the term of this patent is extended or adjusted under 35 U.S.C. 154(b) by 1183 days.

(21) Appl. No.: 09/992,625

(22) Filed: Nov. 6, 2001

(65) Prior Publication Data

US 2002/0076038 A1 Jun. 20, 2002

Related U.S. Application Data

(60) Provisional application No. 60/247,368, filed on Nov. 9, 2000.

(51) Int. Cl.
*H04M 1/00* (2006.01)
*H04M 9/00* (2006.01)

(52) U.S. Cl. .................................................. 379/413

(58) Field of Classification Search ............ 379/395.01, 379/413
See application file for complete search history.

(56) References Cited

U.S. PATENT DOCUMENTS

| | | | | |
|---|---|---|---|---|
| 4,008,427 | A * | 2/1977 | Johnson | 363/37 |
| 5,799,069 | A * | 8/1998 | Weston et al. | 379/93.33 |
| 5,995,381 | A * | 11/1999 | Wakamatsu | 363/16 |
| 6,212,226 | B1 * | 4/2001 | Newton | 375/222 |
| 6,624,635 | B1 * | 9/2003 | Lui | 324/426 |

* cited by examiner

*Primary Examiner*—Curtis Kuntz
*Assistant Examiner*—Alexander Jamal

(57) ABSTRACT

A telephone line driven power supply and power supply method capable of creating high yield, low voltage power using power drawn from a telephone line and supplementing the low voltage power with power from a battery-powered host device, such as a laptop PC, when the voltage level falls below a predetermined voltage level. The telephone line power supply includes a polarity guard, a gyrator, an oscillator, a pulse circuit, an inductor, a startup circuit, a converter, a shunt regulator, and a combiner circuit. The method includes supplying line power from power drawn from a telephone line, receiving host power from a host device, supplying the line power to an electrical device, and supplementing the line power with the host power when the voltage level of the line power falls below a predetermined level.

12 Claims, 3 Drawing Sheets

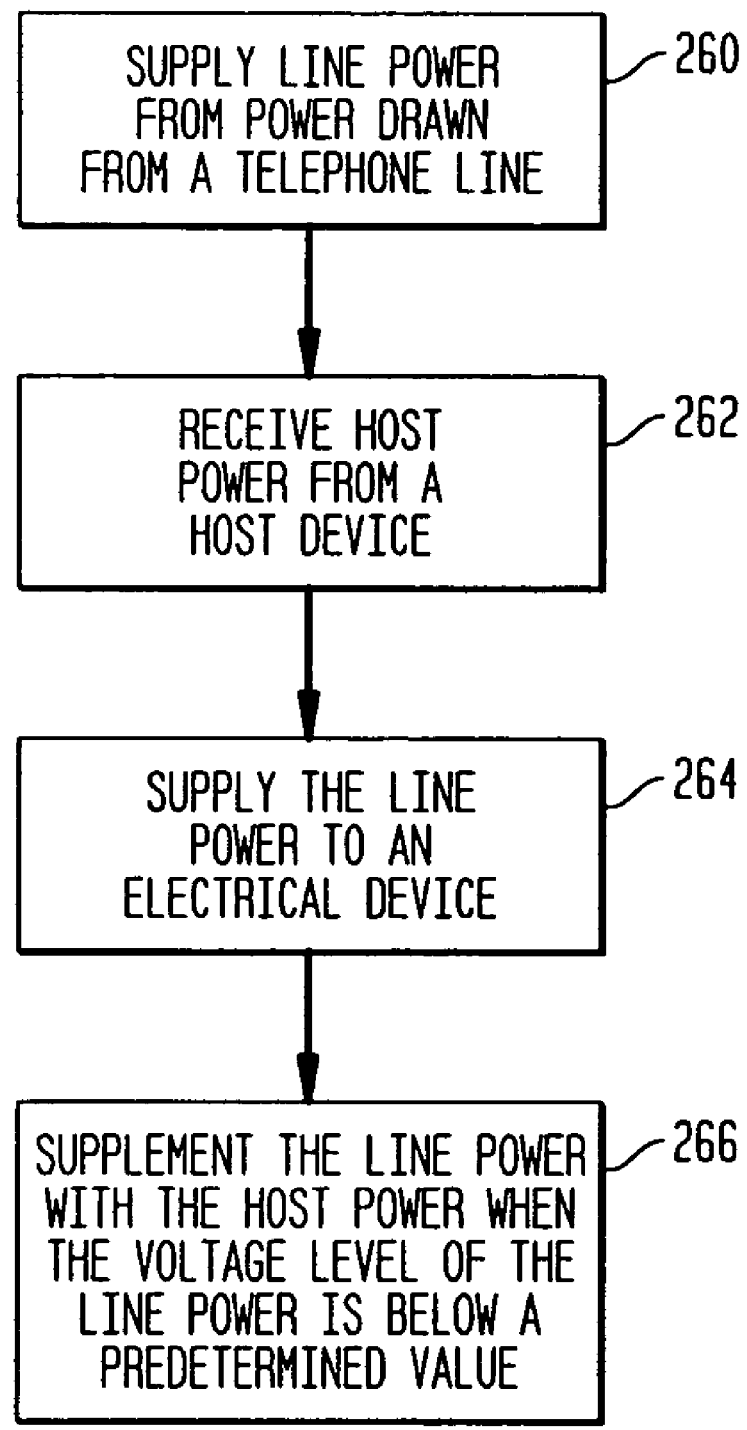

TELEPHONE LINE POWER SUPPLY

CROSS-REFERENCE TO RELATED APPLICATIONS

This application is based on, and claims priority to, U.S. Provisional Application No. 60/247,368, filed Nov. 9, 2000.

FIELD OF THE INVENTION

The present invention relates generally to the field of electronics and, more particularly, to supplying power from a telephone line to power electrical devices.

BACKGROUND OF THE INVENTION

Battery-powered host devices (hereinafter "host devices") such as laptop personal computers (PCs) and personal digital assistants (PDAs) have become increasingly popular as their size and weight have decreased, while great strides have been made in their functionality and battery life. New sales of host devices are driven in part by portability, which depends substantially on the availability of a long battery life. Accordingly, there is significant industry pressure to increase battery life in these host devices.

Presently, host devices are often equipped with electrical devices such as telephone modems. Typically, the electrical devices are powered by the host device to which they are attached, e.g., a laptop PC. When an electrical device is in use, it presents a significant power drain on the battery of the host device, thereby decreasing the battery life of the battery of the host device considerably.

One method for increasing battery life in the host device is to use power from a telephone line to provide a portion of the power required by an electrical device such as a modem. This is possible because telephone lines in the United States and elsewhere can have voltages of over 100V. An example of a telephone line powered electrical device designed to operate off of power derived from the telephone line is a line powered modulator circuit disclosed in commonly assigned U.S. patent application Ser. No. 09/280,473, filed on Mar. 30, 1999, entitled Method and Apparatus for Decreasing Distortion in a Line powered Modulator Circuit, incorporated fully herein by reference.

Existing methods and devices that use power from the telephone lines, however, have many limitations including the following: (1) they power only a portion of the electrical device, such as a modulation circuit within a modem, thereby failing to realize the potential increase in battery life associated with powering the entire electrical device from the telephone lines; (2) they exclusively use power from the telephone lines, thereby becoming vulnerable to telephone line power differences; and/or (3) they are designed to operate at the voltage levels of the telephone line, thereby requiring special circuitry to operate at the relatively high telephone line voltage level of 100V rather than at the typical voltage level of circuitry within the host device, e.g., 5V or less.

Accordingly, there is a need for methods and devices for drawing power from a telephone line to supply all of the power required by an electrical device such as a telephone modem, that can withstand telephone line power fluctuations, and that is suitable for use with existing circuitry. The present invention can fulfill this need among others.

SUMMARY OF THE INVENTION

The present invention provides for an improved telephone line power supply that overcomes the aforementioned problems by creating high yield, low voltage power using power drawn from a telephone line and supplementing the low voltage power with power from a host device, such as a laptop PC, when the voltage level of the low voltage power falls below a predetermined voltage level. The present invention finds particular utility in supplying power to electrical devices such as telephone modems attached to host devices such as laptop PCs and PDAs. By supplying power to an electrical device using power drawn from the telephone lines, the batteries within the host device are not used for the functions performed by that electrical device, thereby extending battery life in the host device.

One aspect of the present invention is a power supply circuit for supplying line power from a telephone line to power an electrical device. In a preferred embodiment, the power supply circuit comprises a polarity guard, a gyrator, an oscillator, a pulse circuit, an inductor, a startup circuit, a converter, a shunt regulator, and a combiner circuit. Using these components, the power supply circuit supplies line power suitable for an electrical device from telephone line current. In addition, the combiner circuit enables a host power supply, such as the batteries of a laptop PC or PDA, to provide supplemental power beyond that supplied by the power supply circuit to compensate for inadequate power supplied by the power supply circuit due to differing telephone line currents.

Another aspect of the invention is a method for powering an electrical device from a telephone line. In a preferred embodiment, the method comprises supplying line power from power drawn from a telephone line, receiving host power from a host device, supplying the line power to an electrical device, and supplementing the line power with the host power when the voltage level of the line power falls below a predetermined level.

BRIEF DESCRIPTION OF THE DRAWINGS

FIG. 2 is a flow chart of a method for powering an electrical device in accordance with the present invention.

DETAILED DESCRIPTION OF THE INVENTION

Figure 1A:
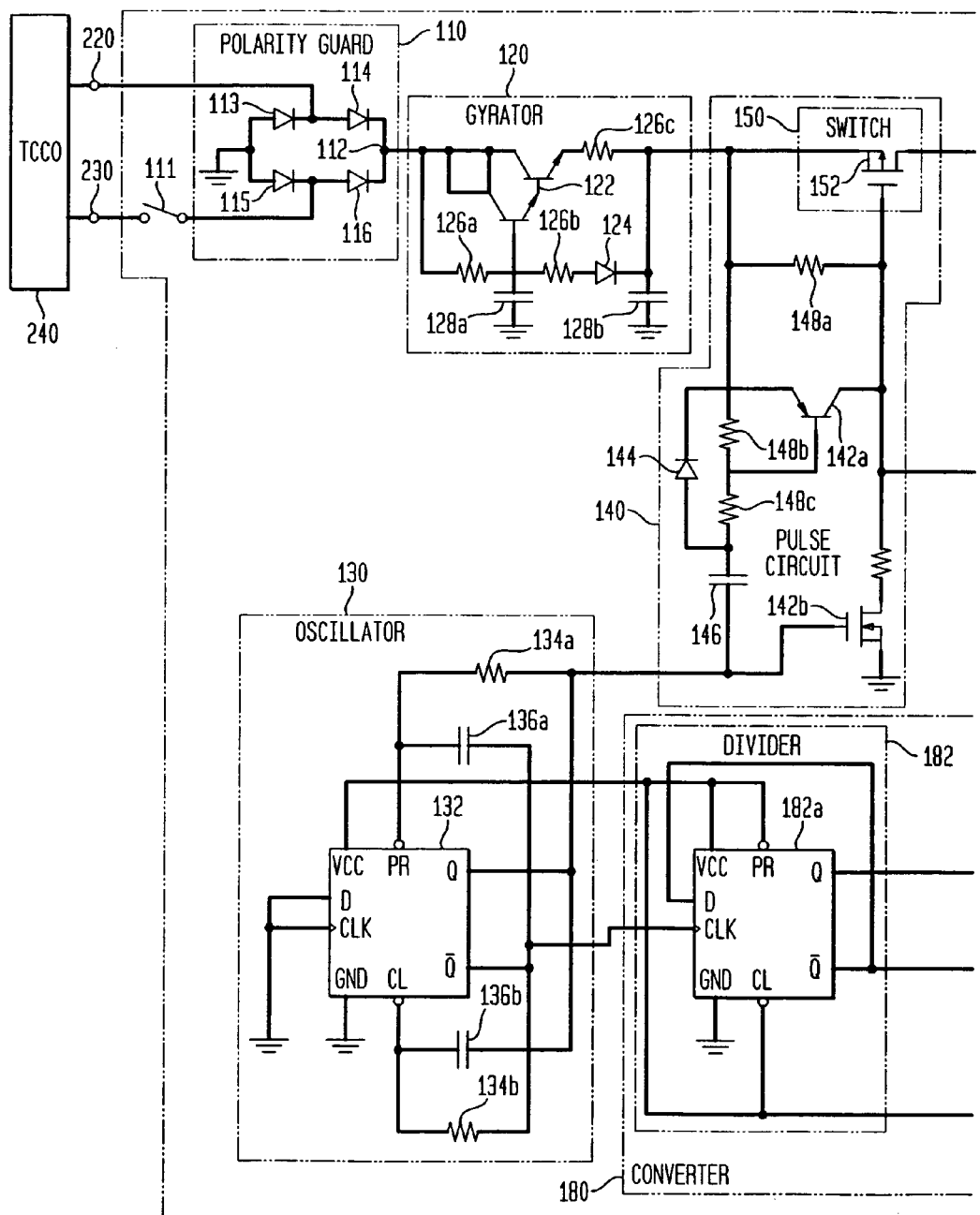
FIGS. 1A and 1B are a schematic of a power supply circuit in accordance with the present invention.
Figure 1B:
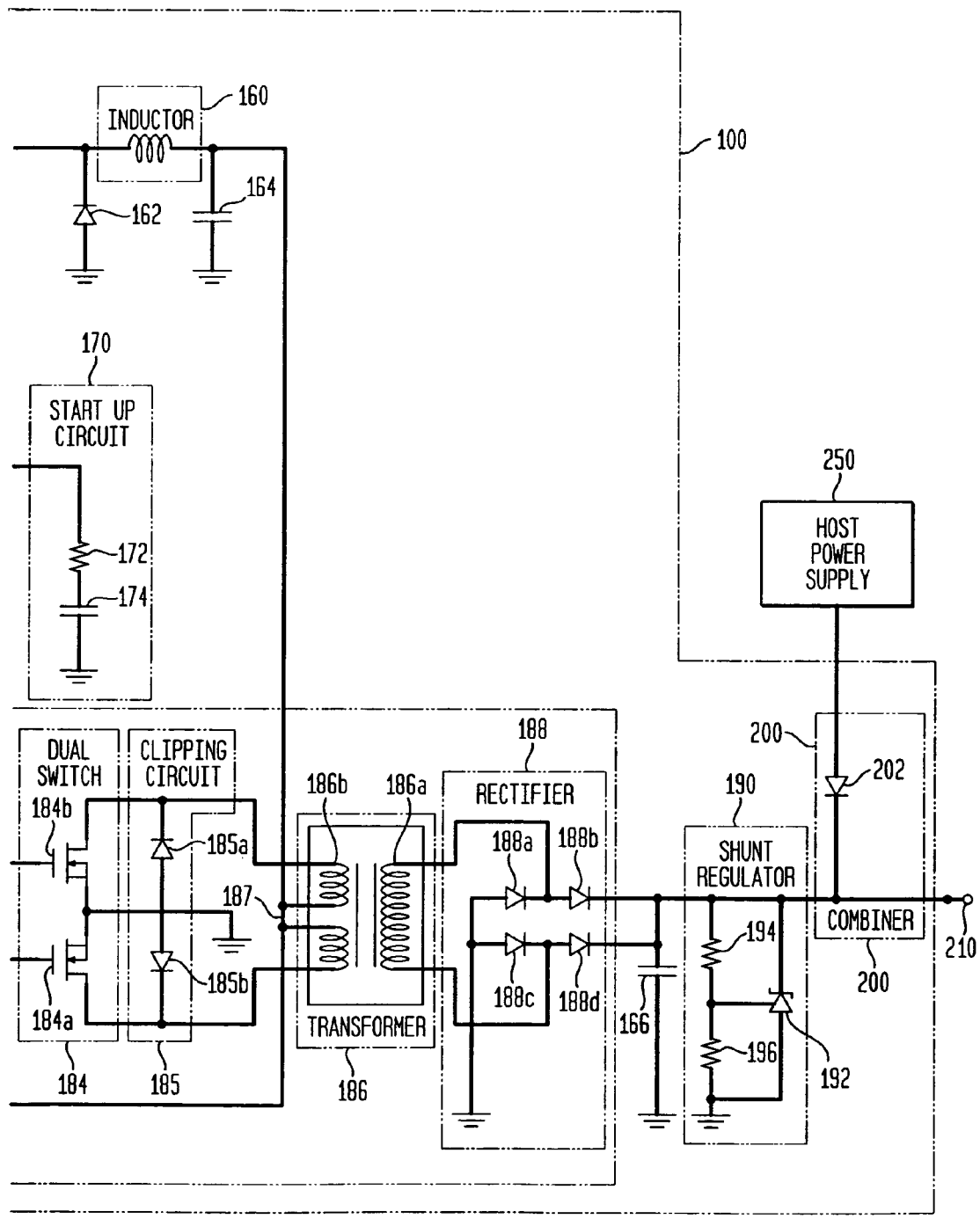

FIG. 1A and FIG. 1B depict[s] a preferred power supply circuit 100 of the present invention. In general, the power supply circuit 100 comprises a polarity guard 110, a gyrator 120, an oscillator 130, a pulse circuit 140, an inductor 160, a startup circuit 170, a converter 180, a shunt regulator 190, and a combiner circuit 200. Using these components, the power supply circuit 100 supplies line power at an output node 210 that is derived from a line current supplied over a telephone line by a telephone company central office (TCCO) 240. The combiner circuit 200 of the power supply circuit 100 enables the line power supplied by the power supply circuit 100 to be supplemented with host power from a host power supply 250 (e.g., a battery of a host device such as a laptop PC or PDA associated with the power supply circuit 100) to compensate for inadequate line power due to limitations in the line current from the TCCO 240.

When an electrical device such as a modem in a host device is in communication with a TCCO 240 (i.e., when the telephone line is in the "off-hook" state), telephone company regulations require that the electrical device draw at least about 15 mA of current from the TCCO 240. In the present invention, the power supply circuit 100 draws at least this required current from the TCCO 240 to supply line power at the output node 210 and indicate to the TCCO 240 that the telephone line is off-hook. The line power supplied by the power supply circuit 100 can be used to supply power to any electrical device, including, but not limited to, a communication device such as a modem, rechargeable batteries, electrical components within the host device, or essentially any device associated with the host device that uses power.

The polarity guard 110 is a well known device that ensures that the power supply circuit 100 is powered with voltage of the correct polarity. The polarity guard 110 ensures that a positive voltage is produced at an output 112 regardless of the polarity of the tip line 220 and the ring line 230. In the illustrated embodiment, the polarity guard is a conventional full-wave rectifier comprising four diodes 113,114,115, and 116.

The gyrator 120 passes DC current while isolating telecommunication signals present at the tip and ring lines 220 and 230 from the power supply circuit 100. The gyrator 120 simulates a very large inductor and acts as a high impedance to AC current and a low impedance to DC current, thereby allowing DC current to pass while not interfering with AC communication signals on the tip and ring lines 220 and 230. The development of a suitable gyrator for use with the present invention will be readily apparent to those skilled in the art. In the illustrated embodiment, the gyrator 120 is a conventional gyrator comprising a Darlington transistor pair 122, a diode 124, resistors 126a, 126b, and 126c, and capacitors 128a and 128b. Preferably, the gyrator 120 provides a DC voltage "drop" of at least a two volts prevent distortion in the telecommunication signals at the tip and ring lines 220 and 230.

The oscillator 130 is a well known device that generates pulses used to control the pulse circuit 140 and the converter 180. In the illustrated embodiment, the oscillator 130 includes a flip-flop 132 configured as a free running oscillator in a known manner using resistors 134a and 134b and capacitors 136a and 136b. Preferably, the oscillator is configured to oscillate at about 500 kHz (period of 2 µs) and produce pulses of about 250 nsec.

The pulse circuit 140 passes current from the gyrator 120 to the inductor 160 in the form of pulses. During each pulse of the oscillator 130, the pulse circuit 140 couples the gyrator 120 to the inductor 160, thereby regulating the passage of power from the gyrator 120 to the inductor 160. The pulse circuit 140 shapes the pulse generated by the oscillator 130 to ensure that a pulse of current having an appropriate rise and fall time and duration is passed from the gyrator 120 to the inductor 160.

In the illustrated embodiment, the pulse circuit 140 includes a switch 150, transistors 142a and 142b, a diode 144, a capacitor 146, and resistors 148a, 148b, and 148c. When the switch 150 is on, current flows from the gyrator 120 to the inductor 160 and when the switch 150 is off, the flow of current to the inductor 160 is cut off. In the preferred embodiment, the switch is on for about 250 s every 2 µs. Preferably, the switch 150 is a MOSFET transistor 152. The development of a suitable pulse circuit for use with the present invention will be readily apparent to those skilled in the art.

The inductor 160 stores energy passed as pulses by the pulse circuit 140 in an electromagnetic field, which is well known in the art. The inductor 160 increases the current level supplied to the converter 180. When the gyrator 120 is coupled to the inductor 160 by the pulse circuit 140, the inductor 160 stores energy in an electromagnetic field and when the inductor 160 is uncoupled from the gyrator 120, the electromagnetic field created in the inductor 160 during charging collapses. The collapse of the electromagnetic field produces a high voltage in the inductor 160, thereby increasing the amount of current to the converter 180, where the return path is through diode 162. In the preferred embodiment, the inductor 160 has an inductance of about 220 µH.

The startup circuit 170 enables current to initially flow through the power supply circuit 100 from the TCCO 240 when the telephone line goes "off-hook" (e.g., switch hook 111 is closed). Since components within the power supply circuit 100 are powered by voltage from the TCCO 240, when the telephone line goes off-hook, the pulse circuit 140 that pulses the inductor 160 must be momentarily turned on to initiate current flow in the power supply circuit 100, thereby allowing the oscillator 130 to start.

In the illustrated embodiment, the startup circuit 170 includes a resistor 172 and a capacitor 174. At startup, the capacitor 174 has a charge of 0V, therefore, the gate of the transistor 152 in the preferred switch 150 will be low. When the gate of the transistor 152 is low, the transistor 152 is on, thereby allowing current to flow from the gyrator 120 to the inductor 160. The current passes though the inductor 160 to the oscillator 130 and converter 180 to power those devices at startup. During startup, the voltage across the capacitor 174 increases as current flows through the resistor 172 until the gate of the transistor 152 is no longer pulled low by the startup circuit 170 and, thereafter, the pulse circuit 140 controls the transistor 152.

The converter 180 converts high voltage power from the inductor 160 to low voltage power at an output node 210 (referred to herein as "line power") and isolates the tip line 220 and the ring line 230 from the devices to which power is supplied. The development of a suitable converter to perform these tasks will be readily apparent to those skilled in the art. In the illustrated embodiment, the converter 180 is a known push-pull converter made up of a divider 182, a dual switch 184, a clipping circuit 185, a transformer 186, and a rectifier 188. A detailed description of the illustrated converter 180 is described below The transformer 186 physically isolates the tip and ring lines 220 and 230 from the circuits to which power is supplied by the power supply circuit 100. In the illustrated embodiment, the transformer 186 has a primary coil 186a and a secondary coil 186b with a center tap 187. The primary coil 186a is coupled across the rectifier 188, the secondary coil 186b is coupled across the dual switch 184, and the center tap 187 of the secondary coil is coupled to the inductor 160. The transformer 186 satisfies the FCC requirement of isolating the telephone lines from a powered device. Preferably, the transformer 186 is a Halo TGM-020P3 (coil ratio 4:4:3).

The divider 182 divides the output pulses of the oscillator 130 to generate two signals which are 180 degrees out of phase with one another. In the illustrated embodiment, the divider 182 includes a flip-flop 182a configured as a divide-by-two divider to divide the output of the oscillator 130 in a known manner. For example, if the oscillator is oscillating at 500 kHz, the divider 182 will produce two square waves of 250 kHz each which are 180 degrees out of phase.

The dual switch 184 is controlled by the signals out of the divider 182 to alternately draw current through the two halves of the transformer's secondary coil 186b to induce an AC voltage across the transformer's primary coil 186a, which is well known in the art. In use, the divider 182 alternates which transistor 184a or 184b is turned on in the dual switch 184. Since the transistor 184a or 184b that is on will allow current to flow, the dual switch 184 alternately draws current through the two halves of the transformer's secondary coil 186b. In the illustrated embodiment, the dual switch 184 includes MOSFET transistors. In a preferred embodiment, the switched current from the inductor 160 alternates flowing through each half of the transformer 186 at about 250 kHz and the inductor 160 is pulsed at about 500 kHz. Therefore, the current path alternates between the two halves of the transformer's secondary coil 186b on each pulse of the inductor 160.

The clipping circuit 185 clips unwanted negative voltages across the transistors 184a, 184b in the dual switch 184. In the illustrated embodiment, the clipping circuit 185 includes one diode 185a coupled between the source and the drain of one of the transistors 184a and another diode 185b coupled between the source and the drain of the other transistor 184b.

The rectifier 188 converts AC voltage to DC voltage. The rectifier 188 is coupled across the transformer's primary coil 186a to produce isolated DC power at the output node 210 from the AC power induced in the primary coil 186a by the current flowing through the transformer's secondary coil 186b. In the illustrated embodiment, the rectifier 188 is a known full-wave rectifier comprising diodes 188a, 188b, 188c, and 188d.

It is contemplated that, if the FCC requirements for isolation were not required, the components of the converter 180 could be removed with the exception of the rectifier 188. The output of the inductor 160 could then be connected directly to the rectifier 188 with the voltage level of the line power at the output node 210 being controlled by the duration of the pulses produced by the pulse circuit 140.

The shunt regulator 190 regulates the voltage level at the output node 210 by ensuring that the voltage will not exceed a predetermined level. Preferably, the shunt regulator 190 does not allow the voltage level to exceed 3.6V. Suitable shunt regulators to achieve this function are well known to those skilled in the art. In the illustrated embodiment, the shunt regulator 190 includes a Zener diode 192 and two resistors 194 and 196. It is contemplated that if rechargeable batteries were coupled to the output node 210, the shunt regulator 190 would not be necessary.

The combiner 200 is a power supply element that supplements line power supplied by the power supply circuit 100 with host power from a host power supply 250 when the voltage level of the line power at the output node 210 supplied by the power supply circuit 100 falls below a predetermined level, e.g., 0.3V below the voltage level of the host power from the host power supply 250. The voltage level of the power supplied by the power supply circuit 100 may fall below this level due to limitations in the current available from the TCCO 240. Preferably, the predetermined level at which supplemental power from the host power supply 250 is used is when the voltage level of the line power at the output node 210 is a predetermined amount below the voltage level of the host power from the host power supply 250.

In the illustrated embodiment, the combiner 200 is a diode 202. Therefore, the predetermined level at which host power from the host power supply 250 will supplement line power from the power supply circuit 100 is a single "diode drop" below the voltage level of the host power from the host power supply 250. Preferably, the diode 202 is a Schottky diode and, therefore, the diode drop is 0.3V; thus, in this embodiment, the supplemental power will be utilized when the line power voltage level at output node 210 drops to 0.3V less than the voltage level of the host power from the host power supply 250.

The power supply circuit 100 contains other components which provide a return path and filtering functions. In the illustrated embodiment, a diode 162 (preferably a Schottky diode) is used to provide a return path for the current produced by the collapse of the electromagnetic field in the inductor 160 during the time that the switch 150 is off. The return path is through the transformer's center tap 187 and the "on" transistor in the dual switch 184. In addition, the illustrated embodiment contains capacitors 164 and 166 for filtering out unwanted AC voltage components.

In use, the power supply circuit 100 of FIG. 1 can be used to power an electrical device such as a telephone modem from a telephone line according to the steps set forth in FIG. 2. In general, the steps comprise supplying line power using power drawn from a telephone line (step 260), receiving host power from a host power supply of a host device (step 262), supplying the line power to the electrical device (step 264), and supplementing the line power with the host power when the voltage level of the line power is below the predetermined level (step 266).

At step 260, power on a telephone line is used to supply line power. Typically, about 15 mA to 30 mA of current can be drawn from the telephone line with the telephone company requiring that at least about 15 mA of current be drawn to maintain the telephone line in an off-hook condition. Therefore, the present invention preferably draws at least about 15 mA when supplying the line power. In addition, telephone line voltage levels can be 100V or higher. Since large voltages (e.g., 100V) will damage typical electronic components, in the preferred embodiment, the voltage level is reduced to a relatively low voltage (e.g., 5V or less) which is compatible with existing electrical devices which can be powered by the host device, e.g., a telephone modem. Preferably, the line power is supplied using the power supply circuit 100 depicted in FIG. 1A and FIG 1B.

At step 262, host power is received from the host power supply of the host device. In the preferred embodiment, the host power is received from the host power supply of an electrical device such as a modem, which, in turn, is coupled to the host device.

At step 264, the line power is supplied to an electrical device. As discussed above, the electrical device may be essentially any electrical device associated with the host device.

At step 266, the line power is supplemented with the host power when the voltage level of the line power falls below the predefined level. When the voltage level of the line power is at or above about the predefined level, only the line power is passed to the electrical device. Preferably, the combiner 200 of FIG. 1B is used to supplement the line power with the host power when the voltage level of the line power falls below the predefined level. The line power may fall below the predefined level due to fluctuations in the current available from the telephone company.

The present invention may be used to increase battery life in a host device such as a laptop PC. For example, if the power supply circuit were used in a telephone modem, the telephone modem would be powered using power drawn from the telephone line (i.e., a telephone line powered modem). The battery life of the laptop PC would not be diminished by using the telephone line powered modem since power for the telephone line powered modem would be provided by the telephone company. In addition, if the power supplied by the power supply circuit exceeded the power requirements of the telephone line powered modem, the excess power could be used to charge the laptop PC's batteries, thereby increasing battery life. Also, in the event that the power supplied by the power supply circuit were insufficient to power the modem, the combiner circuit of the present invention allows the power supplied by the power supply circuit to be supplemented with power from the batteries of the laptop PC to ensure that the telephone line powered modem receives uninterrupted power.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A power supply circuit for powering an electrical device using power from a telephone line, said circuit comprising:
    a gyrator having an input coupled to the telephone line and an output;
    an inductor having and input and an output;
    an oscillator having an output;
    a pulse circuit coupled to said oscillator and coupled between the output of said gyrator and the input of said inductor;
    a converter coupled between the output of said inductor and the electrical device, said converter producing line power at an output; and
    a combiner having a input coupled to a host power supply and an output coupled to the output of said converter, said combiner supplementing said line power with host power from said host power supply when the voltage level of said line power falls below a predetermined level.

2. The circuit of claim 1, wherein said combiner comprises a diode, said diode having an anode coupled to said host power supply and a cathode coupled to the output of said converter.

3. The circuit of claim 2, wherein said diode is Schottky diode.

4. The circuit of claim 1, further comprising:
    a polarity guard coupled between the telephone line and said gyrator.

5. The circuit of claim 1, further comprising:
    a startup circuit coupled to said pulse circuit, said startup circuit controlling said pulse circuit at startup.

6. The circuit of claim 1, further comprising:
    a shunt regulator coupled to the output of said converter.

7. The circuit of claim 1, wherein said pulse circuit comprises a switch coupled between said gyrator and said inductor.

8. The circuit of claim 1, wherein said converter comprises:
    a divider circuit having an input coupled to said oscillator and outputs;
    a transformer having a primary coil and a secondary coil with a center tap coupled to the output of the inductor;
    a dual switch coupled between the outputs of said divider circuit and said transformer;
    a clamping circuit coupled to said dual switch; and
    a rectifier having inputs coupled to said primary coil of said transformer and an output producing said line power.

9. The circuit of claim 1, wherein said converter comprises:
    a rectifier having inputs coupled said inductor and an output producing said line power.

10. The circuit of claim 1, wherein the electrical device is a telephone modem.

11. The circuit of claim 1, wherein the electrical device is a rechargeable battery.

12. The circuit of claim 1, wherein said oscillator is configured to oscillate at about 500kHz and produce about 250 ns pulses and said pulse circuit pulses said inductor with current for about 250 ns every 2 μs.

* * * * *